United States Patent [19]
Kolb

[11] Patent Number: 4,964,266
[45] Date of Patent: Oct. 23, 1990

[54] LAWNMOWER WITH GRASS COLLECTION CONTAINER

[75] Inventor: Walter Kolb, Betzdorf, Fed. Rep. of Germany

[73] Assignee: Wolf-Gerate GmbH, Fed. Rep. of Germany

[21] Appl. No.: 198,564

[22] Filed: May 25, 1988

[30] Foreign Application Priority Data

May 29, 1987 [DE] Fed. Rep. of Germany ....... 3718096

[51] Int. Cl.$^5$ ............................................. A01D 34/70
[52] U.S. Cl. ...................................... 56/202; 56/16.6
[58] Field of Search ...................... 56/202, 16.6, 10.2, 56/DIG. 15

[56] References Cited

U.S. PATENT DOCUMENTS

| | | | |
|---|---|---|---|
| 3,863,428 | 2/1975 | Baxter | 56/10.2 |
| 4,635,047 | 1/1987 | Fox et al. | 56/10.2 |
| 4,648,238 | 3/1987 | Greider et al. | 56/202 |
| 4,782,650 | 11/1988 | Walker | 56/202 |

FOREIGN PATENT DOCUMENTS

| | | | |
|---|---|---|---|
| 1902589 | 8/1970 | Fed. Rep. of Germany | 56/202 |
| 2101864 | 1/1983 | United Kingdom | 56/202 |

*Primary Examiner*—John Weiss

[57] ABSTRACT

In a lawnmower with a grass collection container, the level to which the container is filled is recognizable optically or acoustically. For this purpose, a sensor is arranged in the grass entry mouthpiece of the grass collection container to supply a quantitative or qualitative signal via an electronic evaluation circuit. The collection container is attached to the rear of the frame of the lawnmower.

20 Claims, 2 Drawing Sheets

LAWNMOWER WITH GRASS COLLECTION CONTAINER

BACKGROUND OF THE INVENTION

The present invention relates to a lawnmower having a grass collection container which can be hung on the rear of the lawnmower frame and having a collected grass level indicating device with a level sensor which indicates how full the container is.

Such a lawnmower is known from U.S. Pat. No. 3,971,198. That lawnmower measures the fill condition in the grass container, rather than in the entry mouthpiece thereof In that lawnmower, the grass which has been cut is conveyed via a conveyor channel towards the cover of the container and the grass fills the container from the top. In the region of the cover, a bucket wheel is arranged inside the container. The wheel is turned by the same stream of air and the grass is entrained by the air stream. The rotation of the wheel is transmitted to an indicating disc on the outside of the cover. As soon as the container is full, this becomes evident from the fact that the indicating disc becomes stationary, which shows that the bucket wheel is clogged by grass and can no longer rotate.

Such a bucket wheel arrangement cannot be used when the grass is conveyed into the container from below, via a mouthpiece, and builds up in the container from the rear. In such lawnmowers, the collection container must be emptied upon occurrence of different degrees of filling, depending on the degree of wetness of the cut grass. This is to prevent the grass from being deposited on the ground instead of entering into the collection container, which would require gathering up the deposited grass.

SUMMARY OF THE INVENTION

The object of the present invention is to develop a lawnmower of the bottom entry type so that, upon conveyance of grass from below, via a mouthpiece, the level of grass indicator at all times gives a reliable indication of when the grass collection container must be emptied. This indication is necessary because after this, no reliable conveying of the cut grass into the grass collection basket will take place.

The objects of the invention are realized in a lawnmower that comprises a frame and grass cutting means and means for delivering grass to a grass collection container. The grass collection container is attachable to and removable from the rear side of the frame. The container includes an entry mouthpiece which is toward the bottom side of the container and which faces the lawnmower. There are, of course, means in the lawnmower for conveying the cut grass through the mouthpiece and into the grass collection container.

The significant feature of the invention comprises the presence of a grass level sensor (located in the mouthpiece), not at the entrance of the mouthpiece but rather at a location more toward the rear of the mouthpiece, particularly toward the transition between the mouthpiece and the full container. There is additionally an indicator that is connected with the sensor for indicating the level of filling of grass of the container which level is sensed by the sensor. Preferably, the sensor is arranged on the bottom of the mouthpiece.

Further, there is an electronic evaluation circuit connected between the sensor and the indicator for converting the measurement by the sensor into an indication of the level of collected grass in the mouthpiece. A power supply is connected with the various electrically operable components, and power is either supplied externally of the lawnmower or is generated internally through the motor of the lawnmower.

Various types of sensors may be used including, without limitation, an electric resistance sensor which senses the electric resistance in the mouthpiece or a capacitive sensor which senses the capacitance of the material in the mouthpiece or an inductive sensor which senses the inductance of the material in the mouthpiece. Further, the sensor may be an infrared radiation sensor which senses the infrared radiation of the material in the mouthpiece. Finally, the sensor may be a pressure sensor which senses the pressure being applied to it by the material in the mouthpiece. Other sensors may be apparent to one skilled in the art.

The invention provides the indication "grass collection container must be emptied" before the conveyor channel to the grass collection container starts to become clogged.

The invention is therefore based on the discovery that it is advisable to monitor the level in the grass collection container on the basis of the condition of the channel leading to that grass collection container, rather than to directly measure the level in the container, as has been done previously.

BRIEF DESCRIPTION OF THE DRAWINGS

One embodiment of the invention is described below with reference to the drawing, in which.

DESCRIPTION OF A PREFERRED EMBODIMENT

Figure 1:
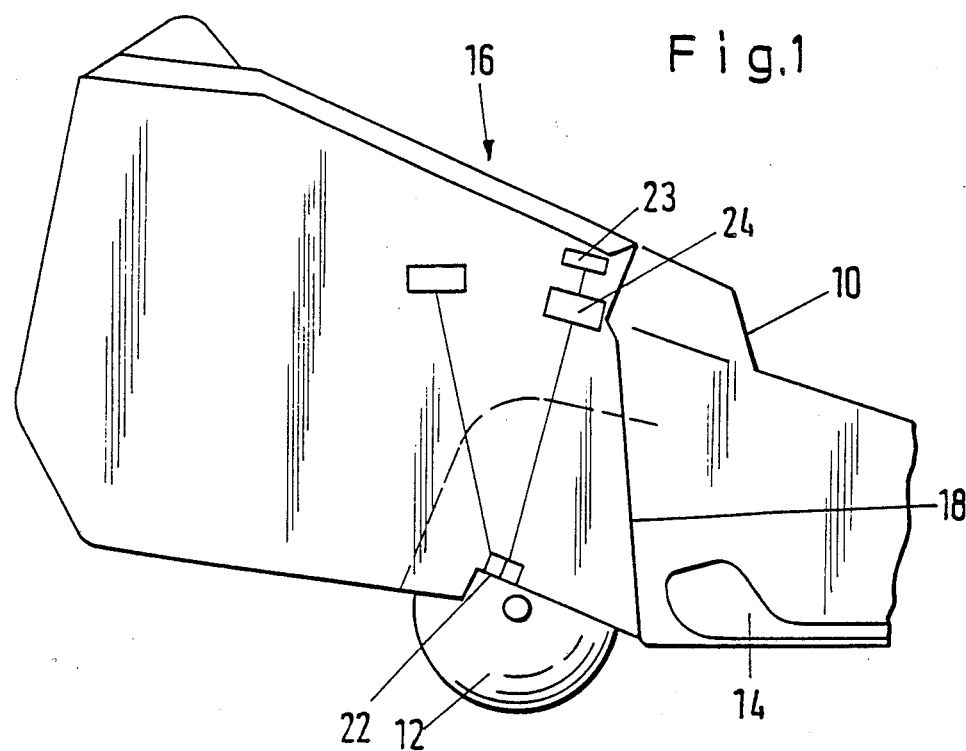
FIG. 1 is a diagrammatic broken-away view of the rear part of a lawnmower with the grass collection container, which has filled about 60% with grass, attached to the lawnmower.
Figure 2:
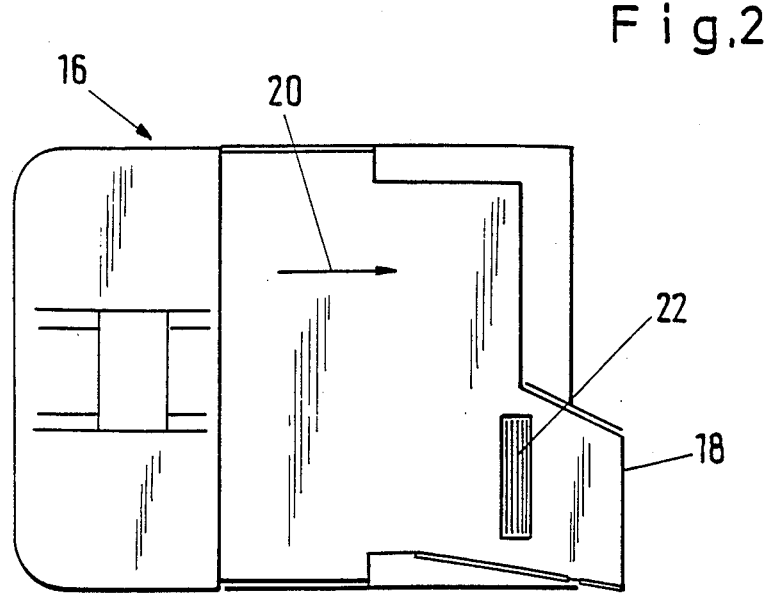
FIG. 2 is a plan view of the lawnmower part of FIG. 1.

In the drawings, only the frame 10 with the rear wheels 12 and part of the rotating blade 14 of the lawnmower are visible. Attached in known manner on the rear of the frame is a grass collection container 16 having an entrance mouthpiece 18 through which the cut grass is transferred into the collection container 16. That grass has been conveyed to the mouthpiece by the cutter bar provided with air impellers in known manner. As indicated by the arrow 20 in FIG. 2 and as shown diagrammatically in FIG. 1, the grass builds up from the back toward the front in the collection container 16.

In the embodiment shown, a sensor 22 is located in the region of the mouthpiece 18, and particularly on the bottom of the funnel-shaped mouthpiece at the rear of the mouthpiece, that is, place of transition of the mouthpiece to the main portion of the collection container. This place for locating the sensor is favorable inasmuch as the mouthpiece is normally kept open during operation, and the mouthpiece also becomes closed only when that given degree of filling has been reached when the container is to be removed and emptied.

The sensor may be developed as a capacitive, inductive or resistance sensor which measures those electrical conditions in the grass collected in the mouthpiece or may be developed as an infrared sensor which senses infrared or heat radiation there. The sensor may even be a pressure sensor, sensing the pressure grass is applying to it.

Any type of sensor is connected to an electronic evaluation circuit 23, not shown in detail, which produces an acoustic or optical warning signal at indicator 24 as soon as the sensor 22 notes that the mouthpiece has become clogged. In an electric mower, the electronic circuit can be fed from a power supply in the form of a power line. In a mower which is driven by a gasoline engine, that circuit can be fed by a power supply that is either ignition voltage generator or by a small additional generator which is operated by the engine. The power supply can also be formed of a dry cell or storage battery. In this connection, the electronic circuit 23 can also have setting means, for instance in the form of setting resistors, which make it possible to adjust for dry grass, moist grass and wet grass so as to take the different conditions of conductivity of the collected grass into consideration.

The electronic circuit and the current generator, which includes the internal part of the power supply are advisedly arranged in a protected fashion within the frame of the lawnmower. The current is fed to the sensor via contacts which are positioned to close the circuit when the collection container is attached, that is the collection container engages and closes the contacts. In order to assure dependable contacting, the arrangement is advisedly such that the contact is subject to a positive cleaning action upon the movement of the attachment associated with the collection container.

Figure 3:
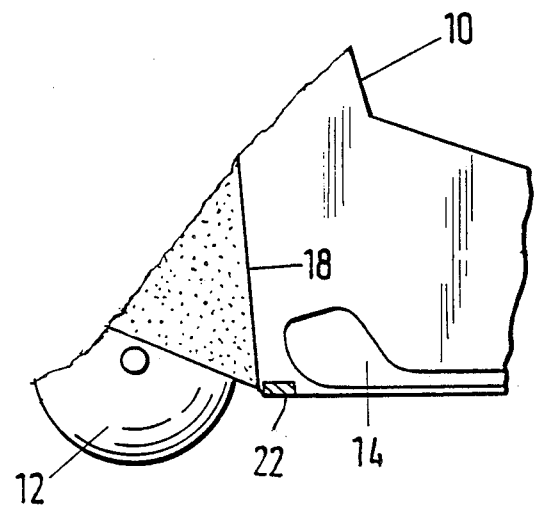
FIG. 3 is a view like FIG. 1, but with a sensor illustrated schematically at the end portion of a wind tunnel.

This invention is not limited to the embodiment which has been shown. As illustrated in FIG. 3, it is also possible to arrange the sensor 22 at the end portion of the wind tunnel in the lawnmower so as to avoid the transmission of current to the collection container.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A system for cutting and collecting grass, comprising:
    (A) a lawnmower, comprising:
        (a) cutting means for cutting grass; and
        (b) a frame;
    (B) a grass collection container removably attached to said frame of said lawnmower, said grass collection container comprising:
        (a) a main portion;
        (b) a bottom side; and
        (c) an entry mouthpiece in the vicinity of said bottom side, said entry mouthpiece being between said cutting means of said lawnmower and said main portion;
    (C) means for conveying cut grass from said cutting means, through said entry mouthpiece, and into said main portion of said grass collection container;
    (D) a sensor for directly sensing the presence of cut grass filling the entry mouthpiece of the grass collection container;
    (E) an indicator operatively connected to said sensor for indicating the level of grass in said container responsive to the characteristic sensed by said sensor.

2. The system of claim 1, wherein said sensor is located in said entry mouthpiece, removed from said frame, and more toward said main portion of said container.

3. The system of claim 2, wherein said frame has a rear side, said container being removably attached to said rear side of said frame.

4. The system of claim 3, wherein said sensor is an electrical resistance sensor for sensing the electrical resistance of cut grass in said mouthpiece.

5. The system of claim 3, wherein said sensor is an electrical capacitance sensor for sensing the electrical capacitance of cut grass in said mouthpiece.

6. The system of claim 3, wherein said sensor as an electrical inductance sensor for sensing the electrical inductance of cut grass in said mouthpiece.

7. The system of claim 3, wherein said sensor is an infrared radiation sensor for sensing infrared radiation radiated by cut grass in said mouthpiece.

8. The system of claim 3, wherein said sensor is a pressure sensor for sensing pressure applied by cut grass in said mouthpiece.

9. The system of claim 3, further comprising an evaluation circuit for electronically evaluating a signal from said sensor to determine the amount of cut grass in said mouthpiece, said evaluation circuit being connected to said indicator so as to indicate the level of cut grass in said collection container.

10. A system for cutting and collecting grass, comprising:
    (A) a lawnmower, comprising:
        (a) cutting means for cutting grass; and
        (b) a wind tunnel for conveying cut grass from said cutting means;
    (B) a grass collection container for receiving cut grass conveyed through said wind tunnel of said lawnmower, said grass collection container comprising:
        (a) a main portion;
        (b) a bottom side; and
        (c) an entry mouthpiece in the vicinity of said bottom side, said entry mouthpiece being between said wind tunnel of said lawnmower and said main portion;
    (C) a sensor for directly sensing the presences of cut grass filling the entry mouthpiece of the grass collection container;
    (D) an indicator operatively connected to said sensor for indicating the level of cut grass in said grass collection container responsive to the characteristic sensed by said sensor.

11. The system of claim 10, wherein said wind tunnel includes an end portion, said sensor being located at said end portion of said wind tunnel.

12. The system of claim 11, wherein said sensor is an electrical resistance sensor for sensing the electrical resistance of cut grass in said mouthpiece.

13. The system of claim 11, wherein said sensor is an electrical capacitance sensor for sensing the electrical capacitance of cut grass in said mouthpiece.

14. The system of claim 11, wherein said sensor is an electrical inductance sensor for sensing the electrical inductance of cut grass in said mouthpiece.

15. The system of claim 11, wherein said sensor is an infrared radiation sensor for sensing infrared radiation radiated by cut grass in said mouthpiece.

16. The system of claim 11, wherein said sensor is a pressure sensor for sensing pressure applied by cut grass in said mouthpiece.

17. The system of claim 11, further comprising an evaluation circuit for electronically evaluating a signal from said sensor to determine the amount of cut grass in said mouthpiece, said evaluation circuit being connected to said indicator so as to indicate the level of cut grass in said collection container.

18. A method of collecting grass, said method comprising the steps of:
conveying cut grass from a lawnmower, through an entry mouthpiece of a grass collection container, and into a main portion of said grass collection container;
using a sensor to directly sense the presences of cut grass filling the entry mouthpiece of the grass collection container, said sensor being located in said entry mouthpiece, removed from said lawnmower, and more toward said main portion of said container;
indicating the level of grass in said grass collection container responsive to the characteristic sensed by said sensor; and
removing said grass collection container from said lawnmower when said grass collection container becomes full, emptying said grass collection container, and reconnecting said grass collection container to said lawnmower.

19. The method of claim 18, wherein said steps of removing and reconnecting said container include the steps of disconnecting and connecting said sensor from a source of power protected within said lawnmower.

20. The method of claim 19, wherein said steps of disconnecting and connecting said sensor include the step of cleaning electrical contacts between said sensor and said source of power.

* * * * *